April 15, 1969  C. FRADERA PELLICER ET AL  3,438,838
METHOD OF MANUFACTURING DECORATIVE PANELS AND THE RESULTING
ARTICLE FORMED THEREBY
Filed Nov. 3, 1965
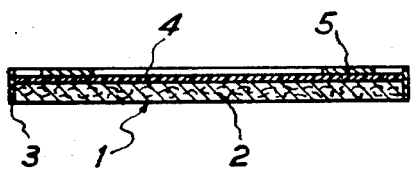
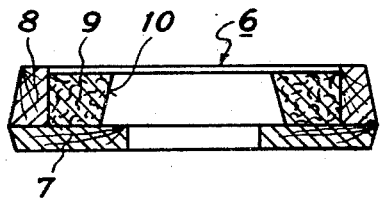
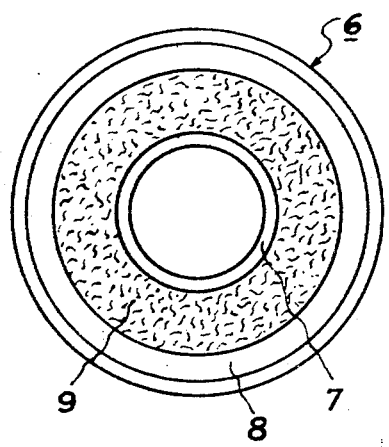
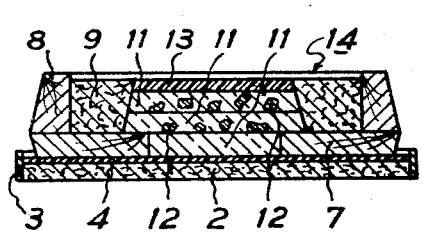
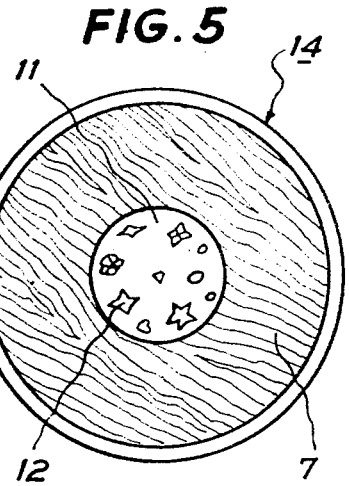
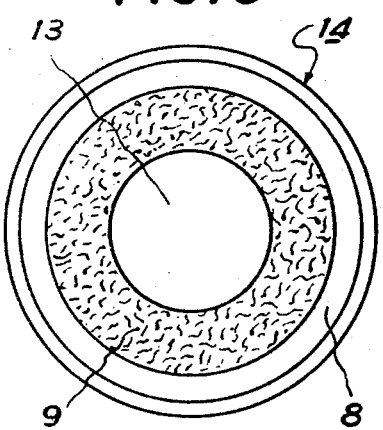
INVENTORS:
CARLOS FRADERA PELLICER,
MARIO FRADERA PELLICER
by Jacob L. Kollin
ATTORNEY

United States Patent Office 3,438,838
Patented Apr. 15, 1969

3,438,838
METHOD OF MANUFACTURING DECORATIVE PANELS AND THE RESULTING ARTICLE FORMED THEREBY
Carlos Fradera Pellicer and Mario Fradera Pellicer, Plaza Conde de Rodezno 11, Pamplona, Navarra, Spain
Filed Nov. 3, 1965, Ser. No. 512,616
Claims priority, application Spain, Nov. 19, 1964, 306,163
Int. Cl. B44f 7/00; B32b 3/02
U.S. Cl. 161—5                                                6 Claims

ABSTRACT OF THE DISCLOSURE

A method and the resulting article of forming a decorative panel by providing a frame with a ring or hoop projecting from the rear surface thereof and applying successive fluid layers of transparent plastics and ornamental items through an opening provided by said frame and ring or hoop with polymerization of each layer before application of the next layer. The last layer applied is an opaque plastic which serves as a backing for the decorative transparent layers and ornamental items. A porous protective bevelled edging may be applied to the inner surface of the ring or hoop, in contact with said frame to retain the pastille formed by the plastic layers during molding.

---

The present invention relates to a method of manufacturing decorative panels and to a decorative panel produced by that method.

It is the custom for some internal furnishings and decorations to include decorative patterns to improve the effect of the visible parts. These patterns are of many kinds and are designed in accordance with the other features of the article or place of application.

The present method has been devised along these lines with the aim of producing panels adapted to serve as decorative elements on their own or to form a decorative part of items of furnishing and so on.

In the method according to the invention, a support comprising a frame having a plane front surface and a peripheral hoop projecting from its rear, such hoop preferably being made of a good-quality timber, is prepared, and a porous protective edging can be added to the inside of the hoop, and a plane rigid base having a top projecting edge has applied to it a fluid plastics layer which after vulcanisation can give a mirror-like surface, the whole being such that, after a circular strip of adhesive material has been placed on the last-mentioned surface, the support is placed thereon by its front face and is therefore immediately secured to the base so that the support takes on the form of a mould whose interior has poured into it consecutive layers of a transparent plastic alternating with ornamental items, a final opaque plastics layer being applied to serve as a base for the preceding layers whereafter—after polymerisation of the materials—the support is separated from the base and the resulting panel is given a final finishing polishing treatment, the panel having at the centre of its front surface a transparent thickness in which the ornamental items can be seen at different depths, the base being available for another operation. Of course one or more of the layers can be devoid of ornamentation.

The protective hoop takes the form of a body, made preferably of an inert agglomerated material, the inner edge of the body being bevelled and being closed from the front towards the rear to cooperate with the frame of the support to form a dovetailed shape adapted to retain the plastics layers poured during moulding. The protective hoop can be formed by the actual frame to give a unitary whole.

The rearward part of the support (frame or hoop) is formed with recesses communicating with the internal space of the support, an appropriate strip of material being positioned to close such communication (in order that the mould may be internally complete and that the plastics poured during moulding may not penetrate into such recesses), whereafter moulding is effected, and after removal from the mould the strip may or may not be withdrawn or be replaced by another appropriate strip, the whole object being that the rebates or recesses or the like can receive appropriate light sources—e.g., electric lamps—adapted to illuminate either directly (if there is no separating strip) or through the said final strip the inside of the pastille formed by the plastics layers poured during the moulding phase, and the ornamental items included in such layers, reflections being produced in the pastille and the presence of the ornamental items being emphasised.

Male moulding elements can be used to contrive corresponding recessed parts (which can subsequently be wholly or partly filled with other materials or paints) during the production of the consecutive plastics layers. Appropriate extra moulds can be used to produce projections for decorative effects, for instance, on the outside surface of the plastics block disposed in the front surface of the resulting panel.

The invention is illustrated by way of example in the accompanying drawings, in which:

FIG. 1 is a view in diametric section of a base for supporting and closing a decorative panel during the moulding phase;

FIG. 2 is a view in diametric section of a support for the internal moulding of a decorative plastics panel;

FIG. 3 is a plan view on to the rear face of the support shown in FIG. 2;

FIG. 4 is a view in diametric section of the system formed by a decorative panel after the moulding phases and by the corresponding bearing or support base;

FIG. 5 is a plan view looking on to the front face of the resulting decorative panel, and FIG. 6 is a plan view looking on to the rear face of the panel shown in FIG. 5.

To manufacture decorative panels of the kind specified, according to the invention, a base 1 is provided formed by a plate or sheet or the like 2, for instance, of agglomerated material. The base or plate has a peripheral edge 3 to which a layer 4 of an appropriately catalysed and vulcanised plastics has been applied, the layer 4 giving an absolutely smooth mirror-like surface. A circular stripe 5 of adhesive material in this case is disposed on the layer 4.

A support 6 comprises a frame 7 comprising a hoop or ring or the like 8; preferably, the elements 7, 8 are both made of a quality timber such as mahogany, the frame 7 having a plane front surface, the hoop 8 projecting from the rear of the frame 7. Protective edging or the like 9 made of a porous agglomerated material is secured to the inside of the frame 7; conveniently, an inner face 10 of the edging 9 is bevelled so that the support 6 in shape resembles a dovetail. The support 6 has its front surface placed on the base 1 and is immediately secured thereto by the adhesive material 5, so that the aperture of the frame 7 is closed and the whole takes on the form of a mould. The mould thus formed has poured into it a transparent plastics to form a layer 11; the latter plastics is a polyester which is appropriately catalysed and accelerated in accordance with the temperature, the polyester ingredients being present in percentages appropriate to ensure that polymerisation does not cause cracking or bursting of the timber support 6 as a result of inadequate percentages causing changes in shape.

Decorative items 12, such as shells, figures and so on are distributed on the layer 11, whereafter a second layer 11 of plastics is formed, whereafter further items 12 are positioned. Thereafter fresh layers can alternate with fresh items until a final layer 13 of an opaquely coloured plastics is provided to serve as a base for the others, the layer 13 being substantially at the level of the rear edge of the hoop 8 of the support 6. Alternatively, the layer 13 can be of a transparent plastics.

The palstics layers 11 must polymerise before the next layer is poured. After the final layer 13 has set it has stuck to it a sheet of cellophane to activate polymerisation. Upon the completion of the phases just outlined, mould removal procedure is initiated so that the finished panel 14 separates from the base 1. The panel 14 is then given various external finishing treatments, its front surface being emeried and polished. The base 1 is then available for the production of further panels.

As a variant, the support 6 can have a base which is closed (at the rear) and which is bounded either by a sheet of appropriate material (secured to the support 6 by appropriate means and at least during moulding) or which is shaped by the actual frame or hoop. In such cases the plastics must be poured via the front surface, with elimination of the working steps corresponding to preparation of the plane base and the connection thereof to the frame if the base has been obtained from the same frame or from the hoop, for in this way it forms a complete mould.

The shapes and sizes of the panels 14 can vary according to the particular purpose for which the panels are required, and accessories for securing or bearing the panels, such as hinges, sockets, feet and so on can be provided on the panels.

The panels 14 are suitable more particularly for the construction of cupboard doors or for items such as bar doors, headboards for beds, wall and roof linings, table boards and a wide variety of other items.

The main effect of the panels 14 is the result of the central zone where the items 12 added during the moulding phases can be seen through the transparent layers at various depths. To heighten the visual effect, electric lamps can, if required, also be provided, being received in recesses in the edging 9, so that the thickness of the plastics layers 11, and therefore the items 12, can be lit up.

The pastille formed by the layers 11 is borne by the inner dovetailed part of the support 6; in any case the porous edging 9 provides sufficient retention to retain the pastille on its own in the absence of the bevelling 10, since the bevelling 10 may be absent in some cases or be replaced by other rebates.

What we claim is:

1. A process for the manufacture of decorative panels, comprising the steps of: preparing a frame having a plane front surface and a peripheral hoop projecting from its rear, and a plane rigid base having a top projecting edge; applying to said base a fluid plastics layer; vulcanising said layer; placing a circular strip of an adhesive material on the vulcanised layer; applying the front surface of said frame to said layer on said circular strip; pouring into said frame from the back consecutive layers of a transparent plastics; polymerising each layer after the pouring thereof and before the pouring of the next layer; distributing ornamental items on the surface of a polymerised layer and before pouring the next layer thereon; applying a final opaque plastics layer on the last transparent layer; separating the ensemble from the base and giving a final polishing treatment to the external surfaces of the resulting panel.

2. A process as claimed in claim 1, in which a porous protective edging is added to the hook, said edging comprising a body, which is preferably made of an agglomerated material, the inner edge of the body being bevelled and being closed from the front towards the rear cooperate with the frame of the support to form a dovetailed shape adapted to retain the pastille formed by the plastics layers poured during moulding.

3. A process as claimed in claim 2, in which the said body of the porous protecting edging is made of an agglomerated material and the inner edge thereof is bevelled from front to rear, said edging cooperating with said frame to define a dovetailed shape adapted to retain the plastic layers.

4. A process for the manufacture of decorative panels, comprising the steps of: preparing a frame having a plane front surface and a peripheral hoop projecting from its rear; placing a sheet of solid material on the back ends of said hoop; pouring into said frame from the front consecutive layers of a transparent plastics; polymerising each layer after the pouring thereof and before the pouring of the next layer; distributing ornamental items on the surface of a polymerised layer and before pouring the next layer thereon; and giving a final polishing treatment to the external surfaces of the resulting panel.

5. A decorative panel comprising in combination: a frame having a plane front surface and a peripheral hoop projecting from its rear; superposed layers of vulcanised transparent plastics in said frame, a plurality of ornamental items being distributed between at least two of said layers; and a back layer of opaque plastics applied to the back surface of the rearmost layer of transparent plastics.

6. A decorative panel as claimed in claim 1, in which the said frame has an inner surface tapering towards the back.

References Cited

UNITED STATES PATENTS

| 288,712 | 11/1883 | Koskul | 161—40 |
| 2,063,315 | 12/1936 | Kuettel. | |
| 2,586,978 | 2/1952 | Murray | 161—7 |
| 2,615,269 | 10/1952 | Steinhardt | 161—19 |
| 2,981,022 | 4/1961 | Anger | 161—18 XR |

FOREIGN PATENTS 867,877  5/1961  Great Britain.

ROBERT F. BURNETT, *Primary Examiner.*

WILLIAM A. POWELL, *Assistant Examiner.*

U.S. Cl. X.R.

156—242, 247, 276, 293, 303.1; 161—6, 18, 42, 44, 413; 264—245, 267, 299